United States Patent
Fahn et al.

(10) Patent No.: US 9,813,249 B2
(45) Date of Patent: *Nov. 7, 2017

(54) URL-BASED CERTIFICATE IN A PKI

(71) Applicant: CERTICOM CORP., Mississauga (CA)

(72) Inventors: Paul Neil Fahn, Redwood City, CA (US); James Semple, London (GB)

(73) Assignee: Certicom Corp., Mississauga, Ontario (CA)

( * ) Notice: Subject to any disclaimer, the term of this patent is extended or adjusted under 35 U.S.C. 154(b) by 584 days.

This patent is subject to a terminal disclaimer.

(21) Appl. No.: 14/458,971

(22) Filed: Aug. 13, 2014

(65) Prior Publication Data

US 2014/0351580 A1    Nov. 27, 2014

Related U.S. Application Data

(63) Continuation of application No. 13/564,472, filed on Aug. 1, 2012, now Pat. No. 8,832,431, which is a
(Continued)

(51) Int. Cl.
*H04L 9/32* (2006.01)
*H04L 29/06* (2006.01)

(52) U.S. Cl.
CPC ........... *H04L 9/3268* (2013.01); *H04L 9/321* (2013.01); *H04L 9/3263* (2013.01); *H04L 63/04* (2013.01);
(Continued)

(58) Field of Classification Search
None
See application file for complete search history.

(56) References Cited

U.S. PATENT DOCUMENTS 5,774,552 A  6/1998 Grimmer
5,903,882 A  5/1999 Asay et al.
(Continued)

FOREIGN PATENT DOCUMENTS

EP  869637   10/1998
EP  1075119  2/2001
EP  1117204  7/2001

OTHER PUBLICATIONS

Gutmann, P.; "A Reliable, Scalable General-purpose Certificate Store," 16th Annual Computer Security Applications Conference 9ACSAC'00), 2000; pp. 278-287.
(Continued)

*Primary Examiner* — Nadia Khoshnoodi
(74) *Attorney, Agent, or Firm* — Jon Gibbons; Fleit Gibbons Gutman Bongini & Bianco P.L.

(57) ABSTRACT

A method of requesting and issuing a certificate from certification authority for use by an initiating correspondent with a registration authority is provided. The initiating correspondent makes a request for a certificate to the registration authority, and the registration authority sends the request to a certificate authority, which issues the certificate to the registration authority. The certificate is stored at a location in a directory and this location is associated with a pointer such as uniform resource locator (URL) that is derived from information contained in the certificate request. The initiating correspondent computes the location using the same information and forwards it to other correspondents. The other correspondents can then locate the certificate to authenticate the public key of the initiating correspondent.

28 Claims, 3 Drawing Sheets

Related U.S. Application Data continuation of application No. 11/641,943, filed on Dec. 20, 2006, now Pat. No. 8,266,425, which is a continuation of application No. 09/978,200, filed on Oct. 17, 2001, now abandoned.

(52) U.S. Cl.
CPC ......... *H04L 63/0823* (2013.01); *H04L 63/18* (2013.01); *H04L 2463/102* (2013.01)

(56) References Cited

U.S. PATENT DOCUMENTS

| | | |
|---|---|---|
| 5,922,074 A | 7/1999 | Richard et al. |
| 6,249,873 B1 | 6/2001 | Richard et al. |
| 6,360,254 B1 | 3/2002 | Linden et al. |
| 6,438,690 B1 | 8/2002 | Patel et al. |
| 6,795,920 B1 | 9/2004 | Bacha et al. |
| 6,823,454 B1 | 11/2004 | Hind et al. |
| 6,959,308 B2 | 10/2005 | Gramsamer et al. |
| 6,978,025 B1 | 12/2005 | Price |
| 7,080,259 B1 | 7/2006 | Nakanishi et al. |
| 2001/0016851 A1 | 8/2001 | Gramsamer et al. |
| 2002/0059519 A1 | 5/2002 | Yamagishi et al. |
| 2002/0073308 A1 | 6/2002 | Benantar |
| 2002/0098830 A1 | 7/2002 | Lauper et al. |
| 2004/0054890 A1 | 3/2004 | Vasseur |
| 2005/0154877 A1 | 7/2005 | Trench |

OTHER PUBLICATIONS

International Search report dated Oct. 17, 2002; in corresponding PCT patent application No. PCT/CA02/01577.

URL-BASED CERTIFICATE IN A PKI

CROSS-REFERENCE TO RELATED APPLICATIONS

The present application is a continuation of U.S. application Ser. No. 13/564,472, filed on Aug. 1, 2012, which is a continuation of U.S. patent application Ser. No. 11/641,943, filed on Dec. 20, 2006 (now issued as U.S. Pat. No. 8,266,425), which is a continuation of U.S. patent application Ser. No. 09/978,200, filed on Oct. 17, 2001, each of said applications are expressly incorporated by reference herein.

FIELD

The present invention relates to a field of cryptography, in particular to the issuance of certificates to mobile clients in a (Public Key Infrastructure).

BACKGROUND

Electronic commerce is hampered by privacy and security, as there is a requirement to ensure that the sender of an electronic transmission is in fact who they purport to be. Due to the non-physical nature of the medium, traditional methods of physically marking the media with a seal or signature, for various business and legal purposes, are not practical. Rather, some mark must be coded into the information itself in order to identify the source, authenticate the contents, and provide privacy against eavesdroppers.

Public key cryptography is the basis for a number of popular digital signature and key management schemes. These include Diffie-Hellman key agreement and the RSA, DSA, and ECDSA digital signature algorithms. Public key algorithms are typically combined with other cryptographic algorithms (e.g. DES) and security protocols (e.g. SSL) to provide a wide range of sophisticated and scalable security services such as authentication, confidentiality, and integrity.

Public key cryptography uses a pair of cryptographic keys—one private and one public. Public key cryptography provides an elegant architecture for authentication and authorization, on any kind of communication channel. The Private key is kept secret and used to create digital signatures and decrypt encrypted messages. The public key of the user can be published and used by others to confirm the validity of a digital signature or to encrypt a message to the owner of the corresponding private key.

A public-key certificate binds a public-key value to a set of information that identifies an entity (such as a person, organization, account or site) associated with use of the corresponding private key.

In order to permit one correspondent to communicate securely with another it is necessary that each is confident of the authenticity of the other and that the public key used by are of the correspondents to verify signatures or decrypt messages is in fact the public key of the other correspondent. This is typically achieved through the use of a certificate issued by a party trusted by both correspondents. The initiating correspondent requests the trusted party to sign the public key with the trusted parties own private key and thereby create a certificate.

The certificate may then be forwarded to the recipient correspondent who has the trusted parties public key. The recipient can therefore verify the initiating correspondent's public key and proceed with a communication.

The trusted party is usually a certifying authority or CA and the CA's public key will be embedded in or provided to the correspondents devices when they subscribe to the infrastructure organized by the CA. There is therefore a high degree of confidence that the CA's public key is accurate and genuine.

Usually a CA is responsible for several tasks. These may include, without restriction:
Receiving certificate requests;
Validating that the requesting entity has control of the private key matching the requested public key (proof of possession);
Validating the conformance of the request with local policy, including restrictions on identifying information, attribute information and/or keying material;
Modifying the request to create conformance with local policy;
Validating the information in the request against external data sources;
Determining if the request has been authenticated by the user or some other authority;
Presenting the request for manual approval by an administrator or administrators;
Signing or authenticating the certificate;
Publishing the certificate to a central storage point or multiple storage points; and
Returning the certificate to the requestor.

The infrastructure organized under the CA is known as a public key infrastructure (PKI) and commonly defined as a set of hardware, software, people, policies and procedures needed to create, manage, store, distribute, revoke and destroy certificates and keys based on public key cryptography, in a distributed computing system. A PKI may include a certificate issuing and management system (CIMS) whereby includes the components of the PKI that are responsible for the issuance, revocation and overall management of the certificates and certificate status information. A CIMS includes a CA and may include Registration Authorities (RAs), and other subcomponents.

The advent of new technologies, such as 2.5G and 3G networks, which provide enough bandwidth to support audio and video content, and seamless global roaming for voice and data has given rise to a new class of mobile devices such as network-connected personal digital assistants (PDAs) and WAP-enabled mobile phones generally referred to as constrained devices. This trend effectively extends traditional personal computer application services to mobile devices, such that traditional e-commerce is performed on mobile devices, that is, mobile commerce. As in e-commerce there is still a need for the client to provide identification, authentication and authorization to the merchant, authentication being the act of verifying the claimed identity of the station or originator, while authentication involves the use of certificates via a certification authority.

However, there exists a problem with the current methods for obtaining mobile certificates from a certification authority due to bandwidth constraints, network latency, and the limitations of the resources of the mobile device such as processor power, speed and memory storage. Certificates are characteristically large pieces of data such that transmission times between the mobile device and the certification authority, or between a pair of mobile devices, may lead to substantial bandwidth usage during transactions and raise issues with data integrity.

It has previously been proposed to reduce the bandwidth in the exchange of such certificates by storing the certificates at a server and allocating an identifier to the stored location. The initiating client may then receive the URL, or other location indicator, of the certificate, which can then be forwarded to the other correspondent. The other correspondent may then retrieve the certificate and verify the information provided. This arrangement reduces the bandwidth needed compared with transmitting a full certificate but does not reduce the number of messages transmitted between the client and the RA or CA, and thus does not affect the significant network latency burden that results, especially when hundreds or thousands of certificate requests per minute may be handled by the CA.

Accordingly, it is an object of the present invention to obviate mitigate at least one of the above disadvantages.

SUMMARY OF THE INVENTION

In accordance with one of its aspects, the invention provides a method of allocating an address to a certificate to be stored in an addressable database for subsequent retrieval, by combining information obtained from a request for a certificate with information known to a party retrieving said certificate.

BRIEF DESCRIPTION OF THE DRAWINGS

Preferred embodiments of the invention will now be described by way of example only with reference is made to the appended drawings wherein.

DETAILED DESCRIPTION

Figure 1:
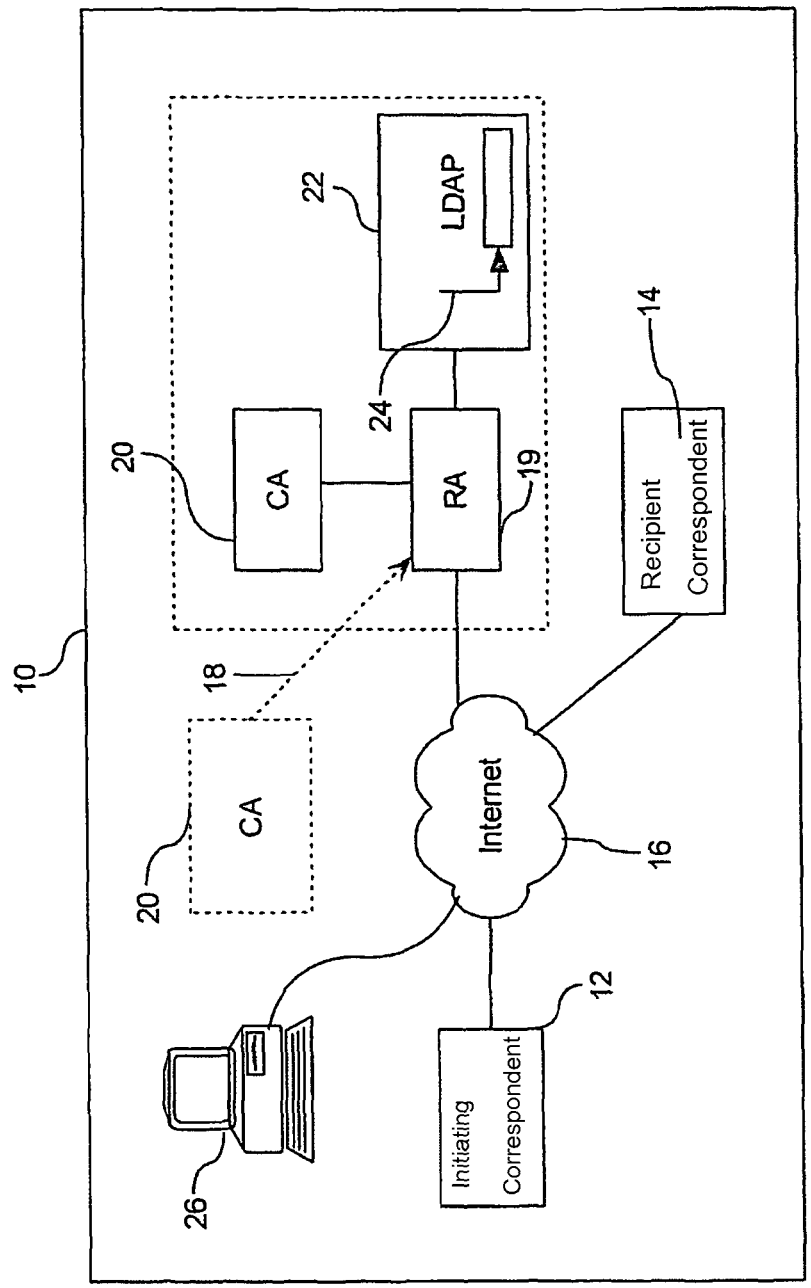
FIG. 1 shows a block diagram of a system for transactions between correspondents in a PKI.

Reference is first made to FIG. 1, showing as a block diagram a data communication system 10 for substantially secure transactions between a pair of correspondents 12 and 14. In the embodiment shown in FIG. 1, the initiating correspondent 12 is shown as a client side wireless device such as a cellular phone, pager or PDA. The initiating correspondent 12 is communicatively coupled to the recipient correspondent 14 via a communication network 16, typically embodied as the Internet.

Secure communications between the correspondents 12 and 14 may be implemented by providing a public key infrastructure (PKI) 18 to the network 16. The PKI 18 includes a registration authority (RA) 19 to receive and process requests for a certificate from correspondent 12 and one or more certification authorities (CA) 20. The PKI 18 provides a standards-based certificate issuance and management system (CIMS) platform for issuing, publishing and revoking public key certificates. Each of the correspondents 12, 14 have the public key of the (CA) 20 embedded in the devices so as to be able to verify messages sent by the (CA) 20 and signed with the corresponding private key or the (CA) 20.

The registration authority 19 has three major roles in the PKI 18:

Firstly, the registration authority 19 handles the Registration Authority (RA) functions in the PKI, e.g., registers users, and approves or denies requests made by correspondents 12, 14, such as requests for first-time certificates and renewal of expired certificates, etc.

Secondly, because of the multiple devices that may be used, and the need for various parties in the network to communicate in accordance with standard protocols, the registration authority 19 translates and relays access protocols/message formats on behalf of PKI enabled clients. The registration authority 19 is typically a networked server responsible for translating protocol requests, and relaying back protocol responses, between PKI clients 12 and the CA 20. The functions to be performed by each of the correspondents 12, 14, the RA 19 and CA 20 are implemented through executable commands embodied in software installed on each of the devices. The software may be supplied on a computer readable medium for installation on respective areas of the devices or may be supplied directly over the network to each of the devices.

For example, in a typical application, WPKI requests from wireless correspondent 12 are converted to Certificate Management Protocol (CMP) requests for the CA 20. Likewise, the registration authority 19 on behalf of the wireless correspondent 12 via a secure WTLS session processes responses from the CA. Similarly, requests from desktop clients 26 using a CMP protocol are approved (or denied) and relayed to the CA 20. The registration authority 19 similarly relays responses from the CA 20 to the desktop client 26.

Thirdly, the registration authority 19 processes and schedules client certificate requests in accordance with the registration policies of the particular PKI in which it is used. As part of this process the registration authority 19 can access database/directories to manage state information.

The CA 20 issues the certificate through the registration authority 19 for use by the correspondent 12 and posts information about the certificate to a directory 22 that can be accessed by other correspondents 14 either directly or through the RA 19. Essentially the certificate is a message incorporating the public key of the correspondent 12 and the identity of the correspondent 12 that is signed by the private key of the CA 20. Each of the correspondents 12, 14 has the public key of the CA 20 embedded and so can verify the CA's signature on the certificates issued by the CA 20.

As an overview of the operation, therefore, the correspondent 12 who wishes to conduct a secure transaction with the correspondent 14 initially applies to the registration authority 19 for a certificate. The registration authority 19 processes the request in accordance with predetermined criteria and either rejects the request or, if approved, passes it to the CA 20. The CA 20 processes the request according to specific procedures and issues a certificate to the registration authority 19. The CA 20 or RA 19 posts the certificate to the directory 22 at a predetermined address indicated by a certificate locator 24 for subsequent use as will be described in further detail below.

The certificate locator 24 is also available to correspondent 12, as will be described below, who initiates in the transaction with the correspondent 14 by forwarding a data package which includes a message signed with the private key of correspondent 12 whose corresponding public key has been certified by the CA 20 and the certificate locator 24 of the certificate.

Upon receiving the data package, the correspondent 14 constructs the address of the certificate based on the information provided in the certificate locator 24, uses that address to retrieve the certificate from the LDAP directory, 22, extracts the public key of the correspondent 12 and verifies the CA's signature in the certificate using the embedded public key of the CA 20. The message from the correspondent 12 is then verified using the extracted public key and the secure transaction completed.

The certificate locator 24 is generated in a manner that mitigates the bandwidth-latency, and number of exchanged messages required by the communication between the correspondents 12, 14 and PKI 18 as follows. The RA 19 processes the information contained in the request for a certificate from the initiating client 12 to obtain the certificate locator of the certificate in the LDAP 22. Similarly, the initiating client 12 processes the information in the request in the same manner to obtain the same certificate locator, which the client 12 sends later in the communication with the recipient 14. The recipient 14 can then combine the certificate locator with previously known information about the location of the LDAP 22, thereby allowing the recipient 14 to reconstruct the address of the certificate and retrieve it. Because the initiating client 12 can calculate the certificate locator, the need for a message from the RA 19 to the client 12 containing the certificate locator, has been eliminated.

Figure 2:
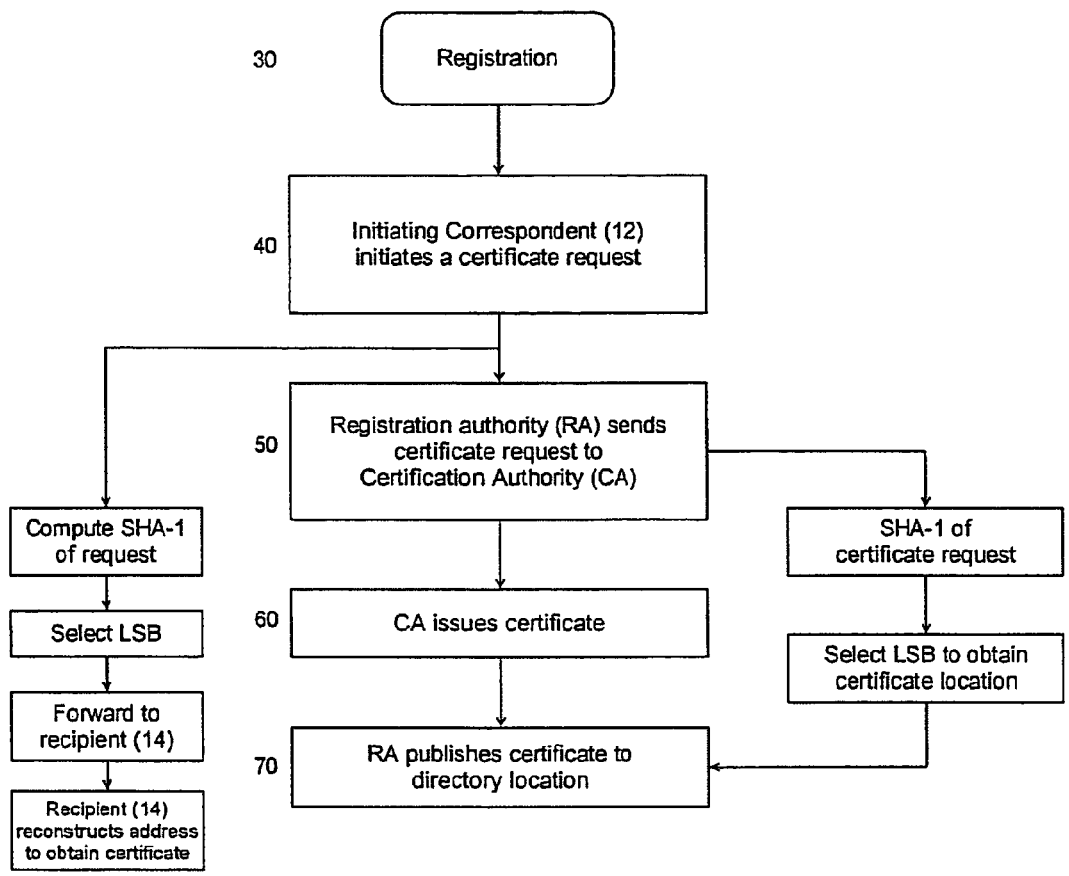
FIG. 2 shows a flow chart outlining the steps for providing a certificate from one correspondent to another.
Figure 3:
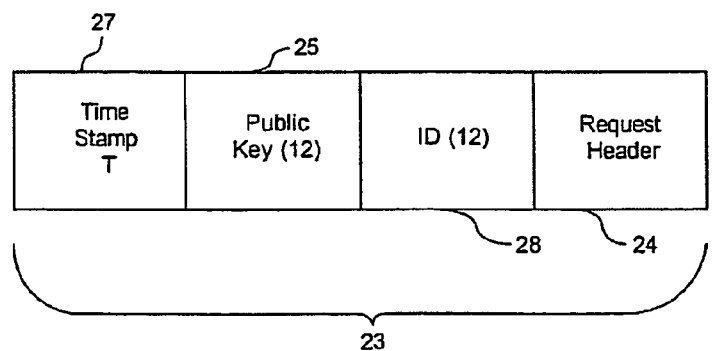
FIG. 3 is a representation of a certificate request.

The procedure for obtaining a certificate from the registration authority 19 for the correspondent 12 is shown on the diagram of FIG. 2. Initially, the correspondent 12 establishes a trusted relationship with the registration authority 19. A secure connection is established between the client 12 and RA 19 in accordance with one of the established protocols, such as WLTS, SSL or TLS. After the secure connection is established, a certificate request 23 is prepared as indicated at 40. The certificate request 23 includes a set of information that will vary from application to application. In one example indicated schematically at FIG. 3 however the certificate request 23 includes a header 24 to indicate that the message is a certificate request, the correspondents public key 25, identifying information 26 associated with the initiating correspondent 12, such as a social insurance number or mothers maiden name, and a time varying indicator 27 such as a date and time stamp or counter.

The certificate request 23 is forwarded to the RA 19 who conducts checks in accordance with the implemented security policy and forwards at 50 the request to the CA 20. The CA 20 will issue a certificate containing the public key of the initiating correspondent 12 and signed with the CA's private key. The CA 20 returns the certificate to the RA 19 for publication in the LDAP 22 as indicated at steps 60, and 70.

In order to publish the certificate, it is necessary to allocate an address at which the certificate may be found and that can be made known to other correspondents 14 in the PKI 18. To provide the address of the certificate, a mathematical function, such as the secure hash function SHA-1 is applied to all or part, as is predetermined, of the information set in the certificate request 23. All or a portion of the resultant output, e.g. the least significant bits, is used as the certificate locator 24. In the example given therefore the certificate request includes the public key, $pk_{12}$; the identity $ID_{12}$ and a time stamp T so the certificate locator 24 is the least significant bits of H($pk_{12} \parallel ID_{12} \parallel T$). The address of the LDAP 22 within the network is known to each of the correspondents registered with the PKI 18 and accordingly the certificate locator is combined with known information identifying the address of the LDAP 22 to establish the address for the certificate.

The address of the certificate will be in the form of a uniform resource locator (URL) or uniform resource indicator (URI) in which the portion of the output of the hash function forms part to the path. For example, the URL of the certificate could be of the following format such as: ldap://www.cert-dir.com/wireless_dir/loc2553AC-2, where 'ldap' refers to the protocol, www.cert-dir.com the location of the directory 22 implementing the lightweight directory access protocol; and the balance the path to the certificate within the directory. The least significant bits of the output of the hash function are represented by the string 2553AC-2, which acts as the certificate locator 24.

The initiating correspondent 12 similarly can compute the hash of the certificate request 23, and select the least significant bits to obtain the string 2553AC2. The string is forwarded as part of the data package to the correspondent 14 during a transaction. The correspondent 14 uses the string as the certificate locator 24 to retrieve the certificate from the LDAP. The retrieval may be carried out in a number of different ways as described below.

Figure 4:
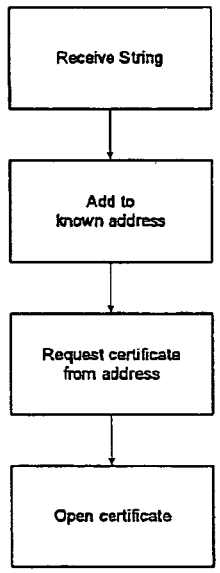
FIG. 4 is a flow chart outlining the steps utilised to determine a certificate address.

In a first embodiment shown in FIG. 4, the location of the directory 22 is known to each subscriber of the PKI 18 and accordingly the recipient correspondent 14 combines the certificate locator 24, i.e. the string, 255AC2 with the location ldap://www.cert-dir.com/wireless_dir/loc to derive the address of the certificate. The recipient 14 therefore directs a request for the certificate to that address and retrieves the certificate to verify the public key of the correspondent 12.

In the above embodiment, it will be appreciated that it is not necessary for the RA 19 to send the URL of the certificate to the correspondent 12 and similarly it is not necessary for the entire address to be forwarded between correspondents. Accordingly, significant bandwidth is saved, one message communication (and its associated latency) is saved and the address of the certificate can easily be recreated by the recipient 14.

In the event the recipient 14 is unable to recreate the address, the initiating correspondent 12 is able to reconstruct the address and send it in its entirety or alternatively, retrieve a copy of the certificate and forward it.

It will be appreciated that the bit string derived from the information in the certificate request 23 may be used as a pointer to the address of the certificate in the directory 22 with a mapping from the bit string to the actual location being performed at the directory 22 or at the RA 19.

In another embodiment, the RA 19 may forward the certificate request to the CA 20 and the CA 20 will process the certificate request to obtain the certificate locator and will return the certificate and the certificate locator to the RA 19, who will determine the address from the certificate locator and publish the certificate in the determined address in the LDAP directory. Alternatively, the RA 19 may forward the certificate request to the CA 20 and the CA 20 will process the certificate request to obtain the certificate locator, determine the address from the certificate and publish the certificate in the determined address in the LDAP directory. In each of the above two examples, the CA performs processing steps that are handled by the RA in the preferred embodiment. In general the division of labor between the RA and the CA may vary from system to system.

By including a time varying information in the certificate request, the output of the hash function will be different for each request made and accordingly the chance of collisions between the addresses computed will be minimized.

The mathematical function applied to the certificate request may be functions other than a hash function, such as a concatenation of the constituent information or an interleaving of the information, as the address is usually intended to be a matter of public record rather than a secret or secure.

Figure 5:
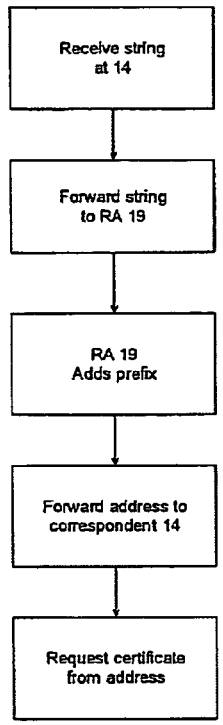
FIG. 5 is a flow chart similar to FIG. 4 of an alternative embodiment for determining the certificate address.
Figure 6:
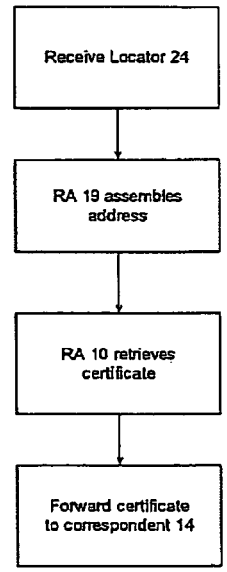
FIG. 6 is a flow chart similar to FIG. 4 of a further alternative embodiment for determining the certificate address.

As described above, the correspondent 14 reconstructs the certificate address in order to retrieve it. As an alternative, as shown in FIG. 5, the certificate locator 24 may be forwarded by the correspondent 14 to the RA 19 who constructs the address to the extent necessary to retrieve the certificate and return the address to the correspondent 14. As another alternative, shown in FIG. 6, the certificate locator 24 may be forwarded to the RA 19 who constructs the address to the extent necessary to retrieve the certificate, retrieves the certificate, and returns the certificate to the correspondent 14.

Figure 7:
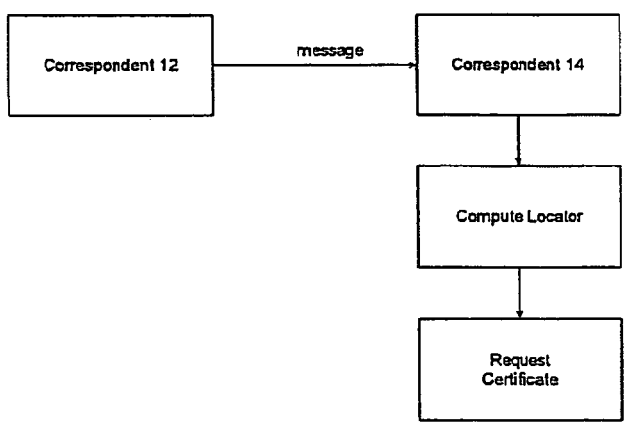
FIG. 7 is a flow chart showing an alternative embodiment to that shown in FIG. 2.

In a further embodiment illustrated in FIG. 7, it may be feasible to compute the certificate locator from information forwarded from the initiating correspondent 12 to the recipient 14 as part of the communication protocol. In such a case, the computation of the string and its inclusion in the message forwarded by the initiating correspondent 12 would not be necessary as the application of the function to compute the certificate locator 24 could be performed at the recipient 14. However, in most cases it is believed that the string will be more efficient than including additional information in the protocol.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A non-transitory computer readable medium for allocating an address to enable publishing of a certificate in an addressable database accessible via a communications network, wherein a location of said database is publicly known within the communications network, said non-transitory computer readable medium comprising computer executable instructions for:
   receiving a certificate generation request from a client device via said communications network;
   obtaining a certificate locator by applying a mathematical function to information in said certificate generation request, wherein said certificate locator identifies an address within said database at which to store said certificate; and
   enabling publishing of said certificate, once issued, in said database at said address within said database, said publishing enabling another device in said communications network to retrieve said certificate using said location of said database and said certificate locator,
   said certificate location received by said another device from said client device,
   said client device having generated the certificate locator from said certificate generation request in the same manner.

2. The non-transitory computer readable medium according to claim 1 wherein said certificate locator comprises a string which can be mapped to said address within said database.

3. The non-transitory computer readable medium according to claim 2 wherein said string is used as said address in said database.

4. The non-transitory computer readable medium according to claim 2 wherein said string is utilized as a pointer to said address within said database.

5. The non-transitory computer readable medium according to claim 1 wherein said certificate locator is a portion of an output of said mathematical function.

6. The non-transitory computer readable medium according to claim 1 further comprising instructions for a certificate authority to generate said certificate and publish said certificate in said database using said certificate locator.

7. The non-transitory computer readable medium according to claim 1 wherein said certificate locator is obtained from information including a time varying element.

8. A non-transitory computer readable medium associated with a client device for enabling another device in a communications network to reconstruct an address of a certificate published in an addressable database accessible via said communications network, said non-transitory computer readable medium comprising instructions for:
   generating a certificate generation request;
   sending said certificate generation request to a public key infrastructure for issuing and publishing said certificate, wherein said public key infrastructure processing said certificate generation request obtains a certificate locator by applying a mathematical function to information in said certificate generation request, wherein said certificate locator identifies an address within said database at which said public key infrastructure may publish said certificate;
   generating, at the client device, the same certificate locator from said certificate generation request in the same manner; and
   forwarding said certificate locator generated by said client device to said another device to enable said another device to retrieve said certificate via said communications network by combining said certificate locator with a location of said database in said communications network.

9. The non-transitory computer readable medium according to claim 8 wherein said certificate locator comprises a string configured for mapping to said address within said database.

10. The non-transitory computer readable medium according to claim 9 wherein said string is to be used as said address in said database.

11. The non-transitory computer readable medium according to claim 9 wherein said string is to be utilized as a pointer to said address within said database.

12. The non-transitory computer readable medium according to claim 8 wherein said certificate locator is a portion of an output of said mathematical function.

13. The non-transitory computer readable medium according to claim 9 wherein said certificate generation request is sent to a registration authority in said public key infrastructure.

14. The non-transitory computer readable medium according to claim 8 wherein said certificate locator is obtained from information including a time varying element.

15. A non-transitory computer readable medium for allocating an address to enable publishing of a certificate in an addressable database accessible via a communications network, wherein a location of said database is publicly known within the communications network, said non-transitory computer readable medium comprising computer executable instructions for:
   receiving a certificate generation request from a client device via said communications network;
   obtaining a certificate locator by applying a hash function to information in said certificate generation request, wherein said certificate locator identifies an address within said database at which to store said certificate; and enabling publishing of said certificate, once issued, in said database at said address within said database, said publishing enabling another device in said communications network to retrieve said certificate using said location of said database and said certificate locator, said certificate location received by said another device from said client device, said client device having generated the certificate locator from said certificate generation request in the same manner.

16. The non-transitory computer readable medium according to claim 15 wherein said certificate locator comprises a string which can be mapped to said address within said database.

17. The non-transitory computer readable medium according to claim 16 wherein said string is used as said address in said database.

18. The non-transitory computer readable medium according to claim 16 wherein said string is utilized as a pointer to said address within said database.

19. The non-transitory computer readable medium according to claim 15 wherein said certificate locator is a portion of an output of said hash function.

20. The non-transitory computer readable medium according to claim 15 further comprising a certificate authority generating said certificate and publishing said certificate in said database using said certificate locator.

21. The non-transitory computer readable medium according to claim 15 wherein said certificate locator is obtained from information including a time varying element.

22. The non-transitory computer readable medium associated with a client device for enabling another device in a communications network to reconstruct an address of a certificate published in an addressable database accessible via said communications network, said non-transitory computer readable medium comprising computer executable instructions for:

generating a certificate generation request;

sending said certificate generation request to a public key infrastructure for issuing and publishing said certificate, wherein said public key infrastructure processing said certificate generation request obtains a certificate locator by applying a hash function to information in said certificate generation request, wherein said certificate locator identifies an address within said database at which said public key infrastructure may publish said certificate;

generating, at the client device, the same certificate locator from said certificate generation request in the same manner; and forwarding said certificate locator generated by said client device to said another device to enable said another device to retrieve said certificate via said communications network by combining said certificate locator with a location of said database in said communications network.

23. The non-transitory computer readable medium according to claim 22 wherein said certificate locator comprises a string which can be mapped to said address within said database.

24. The non-transitory computer readable medium according to claim 23 wherein said string is to be used as said address in said database.

25. The non-transitory computer readable medium according to claim 23 wherein said string is to be utilized as a pointer to said address within said database.

26. The non-transitory computer readable medium according to claim 22 wherein said certificate locator is a portion of an output of said hash function.

27. The non-transitory computer readable medium according to claim 22 wherein said certificate generation request is sent to a registration authority in said public key infrastructure.

28. The non-transitory computer readable medium according to claim 22 wherein said certificate locator is obtained from information including a time varying element.

* * * * *